United States Patent [19]

Hughes

[11] 4,307,464

[45] Dec. 22, 1981

[54] METHOD AND APPARATUS FOR SYNTHESIZING A MODULATED CARRIER TO REDUCED INTERCHANNEL INTERFERENCE IN A DIGITAL COMMUNICATION SYSTEM

[75] Inventor: William C. Hughes, Scotia, N.Y.

[73] Assignee: General Electric Company, Schenectady, N.Y.

[21] Appl. No.: 106,452

[22] Filed: Dec. 26, 1979

[51] Int. Cl.³ .............................. H04L 27/20
[52] U.S. Cl. .................... 375/67; 332/16 R
[58] Field of Search ............ 375/42, 56, 60, 67; 332/16 R; 370/70; 340/170, 310 R

[56] References Cited

U.S. PATENT DOCUMENTS

| | | | |
|---|---|---|---|
| 3,624,560 | 11/1971 | Milton | 375/67 |
| 3,935,386 | 1/1976 | Glasson et al. | 375/67 |
| 3,944,723 | 3/1976 | Fong . | |
| 3,973,087 | 8/1976 | Fong . | |
| 3,973,240 | 8/1976 | Fong . | |
| 4,008,373 | 2/1977 | Nash et al. | 375/53 |
| 4,100,369 | 7/1978 | Stenstrom et al. | 375/67 |
| 4,101,834 | 7/1978 | Stutt et al. . | |
| 4,109,204 | 8/1978 | Kincaid . | |
| 4,135,181 | 1/1979 | Bogacki et al. . | |
| 4,161,720 | 7/1979 | Bogacki . | |

*Primary Examiner*—Jin F. Ng
*Attorney, Agent, or Firm*—Geoffrey H. Krauss; James C. Davis; Marvin Snyder

[57] ABSTRACT

The modulated carrier in a frequency-multiplexed digital communications system is synthesized with each band of the modulated carrier derived from data stored in a read-only-memory. The carrier envelope shape is selected to reduce the sidebands of the digitally modulated carrier and thus reduce interchannel interference. The read-only-memory digital output is applied to a digital-to-analog converter for synthesis of an analog voltage, representing the modulated sinusoidal carrier, having reduced higher frequency content, without the necessity for use of a costly, narrow-bandpass filter.

20 Claims, 6 Drawing Figures

METHOD AND APPARATUS FOR SYNTHESIZING A MODULATED CARRIER TO REDUCED INTERCHANNEL INTERFERENCE IN A DIGITAL COMMUNICATION SYSTEM

BACKGROUND OF THE INVENTION

The present invention relates to digital communication systems and, more specifically, to a novel method and apparatus for synthesizing the modulated carrier in a digital communication system, in order to reduce interchannel interference therein.

Electronic communications systems commonly make use of a carrier frequency which is modulated by the information to be transmitted. For example, information may be transmitted over power lines between a central facility and a multiplicity of remote locations, each tied to the power distribution network. Powerline communications systems of this type are disclosed and claimed in U.S. Pat. No. 3,973,240, issued Aug. 3, 1976; U.S. Pat. No. 3,973,087, issued Aug. 3, 1976; U.S. Pat. No. 3,944,723, issued Mar. 16, 1976; U.S. Pat. No. 4,135,181, issued Jan. 16, 1979; and U.S. Pat. No. 4,161,720, issued July 17, 1979, all assigned to the assignee of the present application and all incorporated herein by reference in their entirety.

It is also known that when a single frequency carrier is modulated, the resultant waveform contains many new frequencies, both higher and lower in frequency than the carrier, which new frequencies are called sidebands. The higher the modulation frequency, the wider the frequency spectrum occupied by the sidebands. In frequency multiplex systems, where a number of carriers are utilized in a common communications channel or medium, the sideband frequencies of one modulated carrier can overlap the frequency space allotted to an adjacent carrier and cause interference. This effect is an important factor in determining the required carrier frequency separation and the allowable information bandwidth. It is known that the signal-to-noise ratio of the received signal can be greatly improved if the frequencies at which the plurality of simultaneous carrier signals are transmitted are all odd multiples of a common frequency, such as the first sub-harmonic of the powerline frequency (60 Hertz(Hz.) in the United States) in powerline communications applications. Use of transmitted carriers at odd multiples of the powerline frequency first sub-harmonic, for improvement of interference suppression, are described and claimed in U.S. Pat. No. 4,101,834, issued July 18, 1978 and U.S. Pat. No. 4,109,204, issued Aug. 22, 1978, both assigned to the assignee of the present invention and incorporated herein in their entirety by reference. In systems of this type, where the powerlines themselves are the communications medium, the carrier frequencies may be in the 5 KHz. to 100 KHz. range. It is known that the signal to noise ratio is improved by transmitting data, in digital form, at a bit rate equal to a selected sub-harmonic of the system-wide (powerline) frequency; thus, the greatest data rate is achieved by setting the bit rate to be numerically equal to the first sub-harmonic of the powerline frequency, e.g. 30 bits per second.

It is known that a convenient and relatively inexpensive method of modulation is to utilize the so-called 180° differential phase shift modulation, wherein the carrier is modulated by 180° between one bit time interval and the next bit time interval to represent a binary "one" and the absence of a phase shift between one bit time interval and the next bit time interval represents the transmission of a binary "zero" data bit. Utilizing this modulation method, with an abrupt change of phase whenever a binary "one" is to be transmitted, the modulating signal with a string of binary "one"s is essentially a carrier having a modulation envelope which is essentially a 15 Hz. square wave; the modulated signal is thus very rich in harmonics and produces a wide spectrum of sidebands. As typical carrier-to-carrier separations are multiples of the common, system-wide frequency (the 60 Hz. powerline frequency) minimum carrier separation of about 7 or 8 times the system wide frequency may be desirable. This minimum carrier separation, in the range of 420 Hz. to 540 Hz., still allows the sidebands of one modulated carrier to have relatively great amplitude at the frequency of an adjacent-channel modulated carrier; for example, a sideband component falling in an adjacent channel 540 Hz. removed from a particular modulated carrier will be only 1/57 times as large as the unmodulated carrier (i.e. the adjacent channel undesired sidebands are only −35 dB. down at the desired channel). This level of interchannel interference is much greater than can be tolerated in a low error-rate system.

The spectrum produced by modulation of a carrier by prior art modulation methods is much wider than is required for accurate transmission of the modulating data bit pattern. It has been proposed that the spectrum may be reduced by filtering the modulating waveform before it is input to a linear transmitter, which translates the modulated carrier over the common transmission medium. This proposed method has at least two major problems: the generation of the carrier frequency, particularly where that carrier frequency must be synchronized to a varying local reference, such as the frequency of the A.C. waveform on the powerline, which requires an additional frequency-tracking carrier generator apparatus, such as a phase-locked loop synchronized to the powerline frequency; and the required bandpass filter must be relatively sharp and therefore have several high-Q sections, making the filter relatively expensive to manufacture and to adjust to the proper frequency, with a different filter design being required for each of the plurality of different carrier frequencies in a frequency-multiplexed system. It is therefore extremely desirable to provide a method in apparatus for providing a modulated carrier, in a digital communication system, which not only reduces interchannel interference, but which also does so in a cost-effective manner.

BRIEF SUMMARY OF THE INVENTION

In accordance with the invention, apparatus for synthesizing a modulated carrier to reduce interchannel interference in a digital communication system, includes a read-only-memory in each addressable data storage space of which is programmed digital data defining the amplitude of a bandpass-filtered carrier waveform having a desired carrier frequency; a counter receiving a clock frequency greater than the carrier frequency, and sequentially and cyclically counting through all of its counting states to address all of the memory spaces of the read-only-memory in sequential and cyclical fashion; and means for converting the digital data output from the read-only-memory, at any particular instant, to an analog voltage of magnitude and polarity determined by the digital data. The clock frequency, which is accurately related to the desired carrier frequency, causes the desired number of carrier frequency cycles to occur during each bit time interval during which a baud of transmitted data is to be sent, while the digital-to-analog converter synthesizes, in step-wise fashion, the carrier frequency waveform to the data value set by the counter-addressed space in the read-only-memory (ROM). Buffering means having a lowpass filter smooths the step-wise-generated and low-pass-filtered carrier frequency waveform for subsequent amplification and transmission.

In one preferred embodiment, wherein data is sent by 180° phase-shift-modulation, the ROM stores data values for the synthesis of the carrier waveform over the entire baud, utilizing a uni-directionally-counting counter means. In another preferred embodiment, the ROM stores the data values for only the first half of the baud, with a bi-directional up/down-counting counter means being utilized with a separate controlling counter, to count up in a first increasing direction though all of the ROM addresses, and synthesize the carrier waveform in the first portion of baud and then having the counting therein reversed to sequentially address decreasing addresses of the ROM to synthesize the latter half of the carrier waveform for the same baud.

Accordingly, it is one object of the present invention to provide a method for synthesizing the modulated carrier in a digital communication system to reduce interchannel interference.

It is another object of the present invention to provide novel apparatus for synthesizing a modulated carrier for use in a digital communication system, to reduce interchannel interference.

These and other objects of the present invention will become apparent upon consideration of the following detailed description, when taken in conjunction with the drawings.

DETAILED DESCRIPTION OF THE INVENTION

Figure 1:
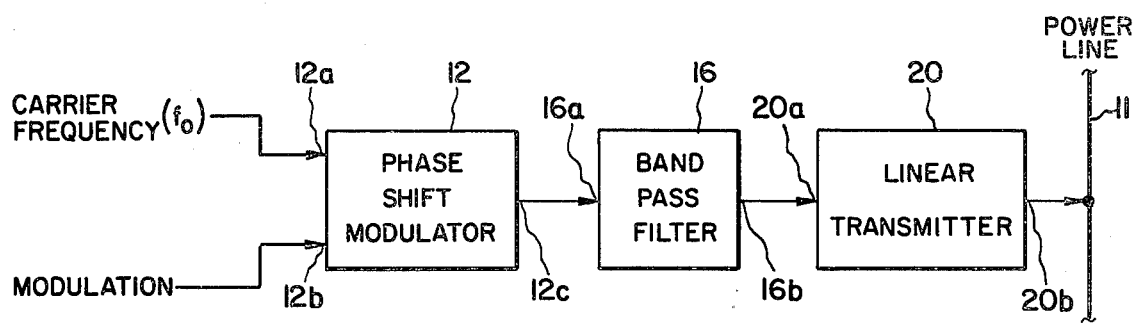
FIG. 1 is a block diagram of a prior art data communication system transmitter.
Figure 2:
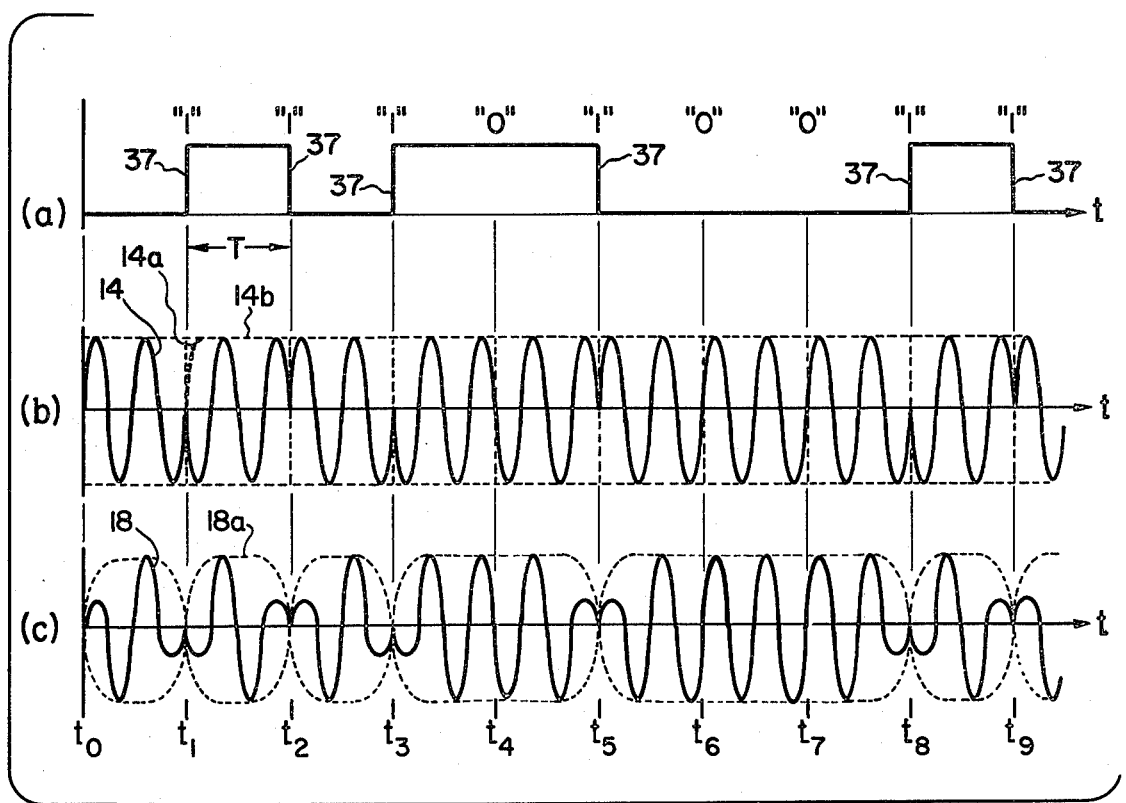
FIG. 2 is a set of inter-related graphs useful in understanding the principles of the present invention, and respectively illustrating a modulating bit stream data pattern; a carrier which is 180° differential phase-shift-modulated in accordance with that data pattern bit stream, and a band-pass-filtered, 180° differential phase-shift-modulated carrier.

Referring initially to FIGS. 1 and 2, prior art apparatus 10 for providing a digitally modulated carrier for coupling to a transmission medium, e.g. powerline 11, includes a carrier modulator 12 receiving a carrier frequency ($f_o$) signal at a carrier input 12a and receiving a binary data bit stream at a modulation input 12b, for modulation of the carrier frequency signal. For purposes of illustration, the 9-bit binary data pattern "111010011" (FIG. 2a) is utilized. A modulator output 12c will have the carrier frequency signal appear thereat with one of the carrier characteristics, (amplitude, phase, frequency and the like) being modified in accordance with the value of the data bit then being transmitted. Illustratively, the modulation format utilized is 180° phase shift modulation, wherein a 180° shift in carrier phase occurs between one bit time interval and the next time interval to transmit a binary "one"; a binary "zero" is transmitted by the absence of a phase shift. As seen in FIG. 2b, the carrier frequency waveform 14 is a sinusoid initially transmitted with a constant phase, as in the time interval between time $t_0$ and $t_1$. At time $t_1$, a binary "one" bit is to be transmitted and the phase of the carrier is rotated 180°, e.g. the carrier frequency waveform is instantaneously a negative value increasing towards zero at an instant just prior to $t_1$ and would, in the absence of a phase reversal, become a positive rising waveform immediately after time $t_1$ (as shown by broken line 14a) but, due to the phase reversal required for transmission of a binary "one", has a falling and increasingly negative instantaneous value after time $t_1$. A phase reversal occurs at times $t_2$ and $t_3$, to modulate the carrier with the second and third binary "one"s, respectively, while a phase reversal does not take place at time $t_4$, as transmission of a binary "zero" occurs in the absence of a 180° phase shift (or phase reversal). Phase reversals occur at times $t_5$, $t_8$ and $t_9$ to send the binary "one"s thereat, and do not occur at times $t_6$ and $t_7$, to transmit the binary "zero"s thereat.

The phase-shift-modulated waveform of FIG. 2b, appearing at output 12c of the phase shift modulator, is received at the input 16a of a filter 16 having a bandpass centered at the carrier frequency ($f_o$), whereby the band pass filter output waveform is that of FIG. 2c. It will be seen that the filtered, modulated waveform 18 has an amplitude-symmetric envelope 18a, which decreaes in amplitude at each data transition, and which envelope may also be time-symmetric. Envelope 18a is somewhat rounded, when a phase change occurs, compared to the square waveform envelope 14b of the non-filtered, modulated waveform of FIG. 2b. By gradually increasing and decreasing, respectively, the envelope amplitude at each data-transition, the spectrum of the transmitted waveform is considerably narrowed and additional suppression of sidebands at an adjacent channel carrier frequency may be obtained. The phase reversals, or lack thereof, at beginning of each bit time interval T, still remain, for recovery by a receiver (not shown) of the encoded data stream. This prior art apparatus has two major drawbacks: the carrier frequency $f_o$ must be generated by apparatus (not shown) connected to modulator input 12a; and band pass filter 16 must be relatively sharp and have several high Q sections. Carrier generation typically requires an additional phase-locked loop for each carrier frequency used in a frequency-multiplexed system, and a different filter design is also required for each frequency. It will be seen that the prior art apparatus, while providing a decreased level of interchannel interference, also results in greatly increased amounts of apparatus which require considerable extra cost to manufacture and labor to align.

Figure 3:
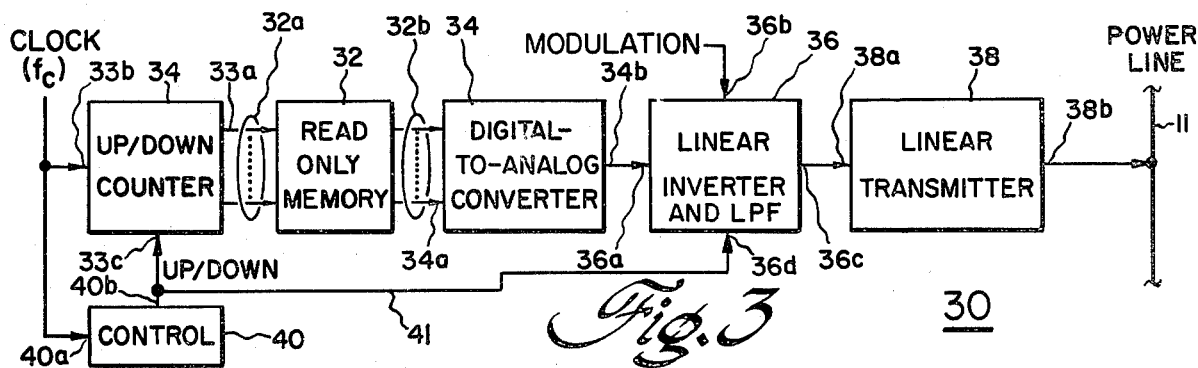
FIG. 3 is a block diagram of a first preferred embodiment of novel apparatus for practicing the novel method of the present invention.
Figure 4:
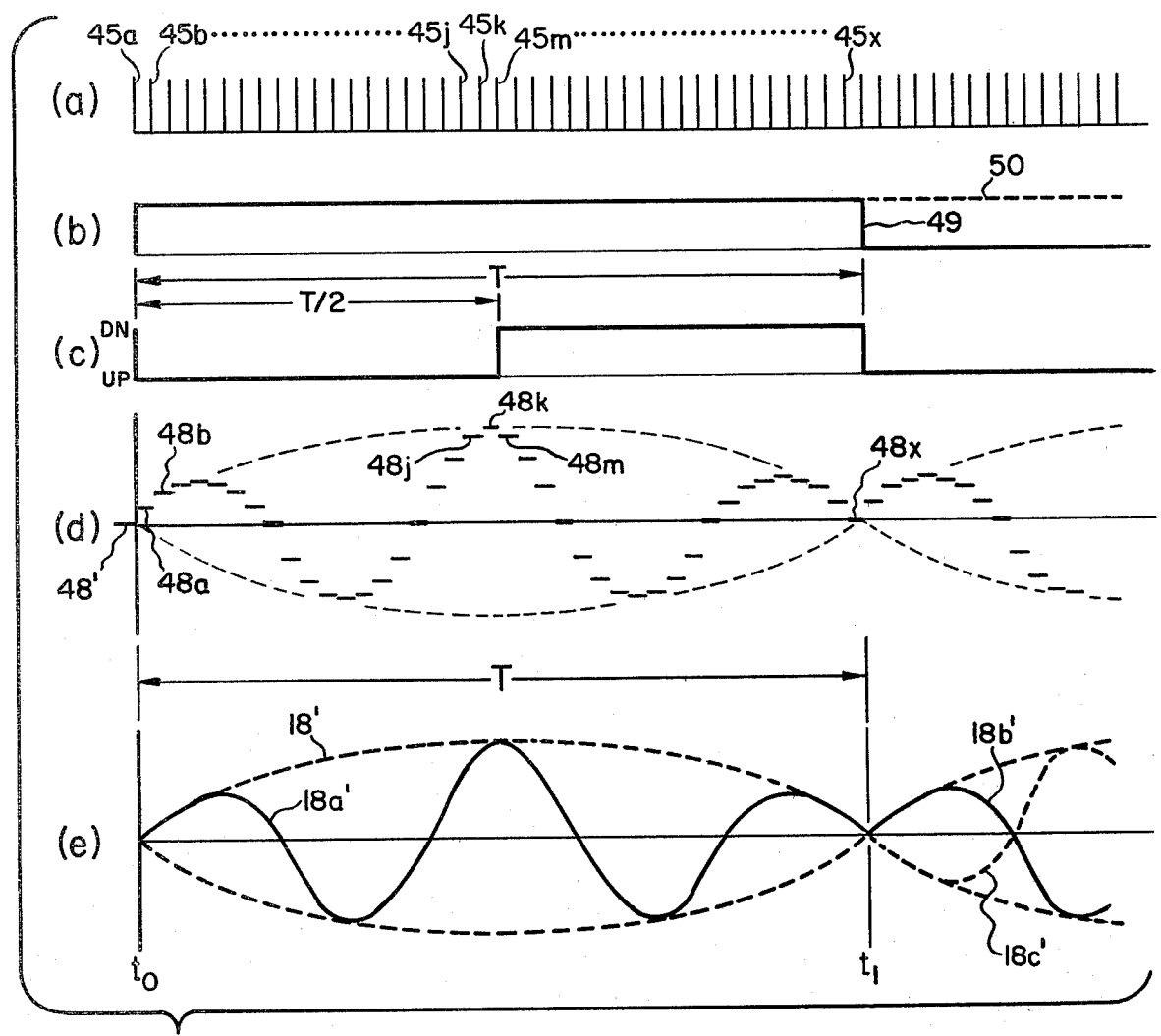
FIG. 4 is a set of inter-related graphs illustrating the manner in which a data-modulated carrier, having pseudo-band-pass-filtered envelope characteristics, is synthesized in accordance with the principles of the present invention, utilizing the apparatus of FIG. 3.

Referring now to FIGS. 3 and 4, I have found that the additional carrier frequency generation equipment and band pass filter are unnecessary if a modulated carrier waveform is generated by my novel apparatus 30. Apparatus 30 utilizes a read-only-memory (ROM) 32 in which the digital value of each of a multiplicity of points, approximating the band-pass-filtered carrier waveform 18 (FIG. 2c) during one bit period thereof, are stored at each different address within the memory. A multi-line input port 32a of the ROM is addressed by connection to a like number of output lines 33a of a counter means 33. Counter 33 has a clock C input 33b which receives a clock signal at a clock frequency $f_c$, to cause the counter to cyclically count sequentially through all counting states thereof. The sequential counting states, appearing at ROM address input port 32a, sequentially read address spaces in the memory; the ROM outputs provide the data values stored at those memory address spaces to a digital-to-analog converter 34 for step-wise synthesis of the pseudo-band-pass-filtered carrier waveform 18 during each bit period T. The data appears at a data input port 34a of digital-to-analog converter 34 and causes an associated level of an analog signal, having the desired carrier frequency $f_o$, to appear at the digital-to-analog converter (DAC) output 34b for introduction into a carrier input 36a of a linear inverter 36. Inverter 36 includes a low-pass filter (LPF) for removing higher frequency components of the step-wise carrier waveform. Inverter 36 has a second input 36b for receiving the binary-valued data bit stream waveform. The appearance of a binary logic level transition, either positive-going or negative going, at modulation input 36b, causes linear inverter 36 to invert the signal appearing at its output 36c, with respect to the phase of the signal appearing at the output immediately prior to a particular bit stream transition. Thus, each bit stream transition 49 (FIG. 4b), indicative of transmittal of a logic "one", inverts the synthesized carrier frequency waveform, having band-pass-filtered envelope characteristics, at the input 38a of a linear transmitter 38, having its output 38b coupled to the powerline communications medium. It will be seen that, as the values stored in the ROM can be selected for minimization of the band-width of the modulated signal, as by calculating the waveform that would be produced by a burst of carrier one bit time interval T long and passing through a desired band-pass filter (or by shaping the initial portion of the carrier waveform in each bit time interval as a raised cosine wave, (i.e. of the form (1+cos t)), the amount of adjacent channel interference can be reduced to a minimum. It should be understood that other synthesized waveform shapes can also be utilized for minimization of adjacent channel interference. For convenience, this envelope shaping can be done, without significant spectrum spreading, at each bit time interval (not just those intervals in which a logic 1 is to be transmitted, as occurs with use of a band-pass filter). This embodiment, while requiring a linear transmitter 38, does not require additional means for generating a carrier frequency, or a separate bandpass filter; the carrier frequency and band-pass-filtered envelope thereof are simultaneously synthesized as ROM 32 is sequentially addressed by counter 33. The clock frequency $f_c$ must be much greater than, and may be a multiple of, the desired carrier frequency $f_o$; the multiplier is established by the number of carrier frequency cycles in one bit time interval T and by the number of discrete steps to be synthesized into one cycle of the carrier frequency waveform. That is, as all storage locations of ROM are to be addressed in one bit time interval T, and as there are R addressable locations in the ROM, the clock frequency $f_c = R/T$.

In a frequency-multiplexed system, all of the plurality of desired transmit frequencies can be generated from the same clock frequency $f_c$, eliminating the need for a like plurality of separate frequency generation means all synchronized to the line frequency.

Advantageously, the number of separately-addressed data locations in ROM 32 can be reduced by making the synthesized waveform symmetrical about the middle of the bit period T. In this manner, only one-half of the band-pass-filtered carrier frequency waveform need be stored. Counter 33 becomes a controllable up/down counter, having an up/down control input 33c. A control means 40 has an input 40a receiving the clock frequency pulses 45 (FIG. 4, waveform a) and an output 40b is connected to up/down control input 33c. Control means 40 may be a counter having the state of its output 40b changing with the receipt of a specified number of clock pulses at counter input 40a; the clock pulse number is equal to the number of ROM ROM addresses to provide the other half (a mirror image) of the synthesized waveform, during the remainder of that bit time interval.

Using a bidirectional counter 33, the generated carrier waveform may be time-symmetrical about a point at the peak of a carrier half-cycle. Therefore, if the up/down control signal amplitude (waveform c of FIG. 4) changes at a carrier cycle peak amplitude point (as illustrated), there is generated a smoothly-changing, constant-phase carrier signal. If the up/down control signal is changed at a point in the step-wise approximation of the carrier stored waveform which is not time symmetrical (i.e. where the time symmetric indicates that the derivative of both the envelope and the carrier sine wave is zero at that time of counter reversal), a discontinuity results which generates unwanted sidebands. If it is desirable to have the counter reversal occur at a zero crossing of the sinewave, then a 180° carrier phase change occurs midway through the bit time interval; a line 41 connects control means output 40b to an auxiliary input 36d of the inverter, and is used to invert the carrier waveform during the latter half of the bit time interval, to remove the phase reversal, independent of the action of inverter 36 responsive to the modulation state then present at inverter modulation input 36b. For 180° phase shift keying, it is desirable to have an integral number of quarter-waves stored in the ROM 32 so that an integral number of half waves are generated in each bit period T.

In operation, at the start, e.g. at time $t_0$, of a bit time interval T, when a modulated carrier signal is to be transmitted, both up/down counter 34 and control counter 40 have been reset to a count of zero and a first clock pulse 45a is received at the clock inputs 34b and 40a, respectively, thereof. The clock pulses may be provided by known means, such as the crystal-oscillator-stabilized phase-locked loop described and claimed in co-pending application Ser. No. 103,032, filed Dec. 13, 1979, and the like. At resetting of control means 40, the output 40b thereof assumes a logic state, e.g. a logic zero, required to place counter 33 in the up-counting mode of its operation (waveform c of FIG. 4). Prior to receiving the first clock frequency pulse at its input 33b, counter 33, being reset, provides a 0 count on its multiplicity of output lines 33a. Illustratively, as ROM 32 has 10 address lines at its address input 32a, counter 33 also has 10 output lines 33a, one output line from each of its counting stages. Upon receipt of first clock pulse 45a, the counter output increases by one count to a binary address 0000000001, at memory address input 32a. The ROM data output lines 32b will now have the 8-bit parallel data word stored at the newly-addressed memory location, which 8-bit data word is received by DAC 34 to provide an analog voltage level 48a which is greater than the substantially-zero voltage level 48' at DAC output 34b immediately prior to the start of counting. Upon receipt of the second clock pulse 45b, counter 33 increases its output count by one, to address the next sequential data storage location in ROM 32 and provide the data stored thereat to DAC 34, which provides a new analog voltage output level 48b. Subsequent clock pulses 45 increase the count at the output of counter 33, thus increasing the address to ROM 32 and recalling the data words stored at the successively addressed memory locations thereof. The successively-addressed data words cause the DAC output 34b voltage level to change in accordance with the addressed data, to run through all of the levels 48 for the carrier frequency waveform to be synthesized during a first half of the bit time interval. Thus, upon receipt of the k-th clock pulse 45k, the output voltage level at DAC output 34b has sequentially assumed a set of values which step-wise synthesizes the psuedo-band-pass-filtered carrier frequency waveform; if k equals the maximum count of control counter 40 and the number of addressable spaces in ROM 32, e.g. k=1024, the next subsequent clock pulse 45m causes the control counter output 40b to change output state, e.g. to a logic 1 level, which change of state at the counter 33 up/down control input 33c controls counter 33 into its down-counting mode. Simultaneously, clock frequency pulse 45m appears at the counter clock C input 33b and causes the count of the counter to be decreased by 1, whereby the address to ROM 32 is also decreased by 1. The 8-bit data word now present at ROM output 32b (and DAC input 34a) is the same data word as was provided for receipt of pulse 45j, immediately prior to pulse 45k, and causes the voltage level 48m at DAC output 34b to be essentially the same as the voltage level 48j thereat immediately after receipt of clock frequency pulse 45j, immediately prior to maximum-count pulse 45k. Subsequent clock frequency pulses cause further decreases in the memory-addressing count at counter output 33a, with corresponding changes in the voltage levels at DAC output 33b. Thus, the memory-addressing count at counter output 33a increases to a maximum value and then decreases to 0, before repeating the increasing-decreasing up/down counting cycle. Thus the data storage locations of ROM 32 are sequentially addressed from the lowest to the highest addresses and then decreasing to the lowest memory address, while the DAC output voltage levels change to form the step-wise modulated carrier-waveform, symmetrical about voltage level 48k, corresponding to clock pulse 45k, occurring at the center of bit time interval T. Accordingly, at the end of the bit time interval, e.g. at time $t_1$, the counter 33 is again at 0, while control means 40 has received the required number of clock pulses to again cause its up-/down controlling output 40b to change state and revert to its initial binary 0 output for controlling counter 33 again to its up-counting mode. Counter 33 now outputs a zero count to address the lowest address storage space in ROM 32 and causes data to be presented to DAC 34 to provide a substantially zero volt output level 48x responsive to the last clock pulse 45x for that bit time interval. The apparatus is now ready to repeat the entire cycle for the next bit time interval, if continued transmission of a carrier frequency is desired.

The step-wise-synthesized carrier, having a simulated band-pass-filtered envelope shape, is applied to carrier input 36a of linear inverter 36. Advantageously, the linear inverter has a low-pass filtering means receiving the step-wise synthesized carrier signal, for removing the high frequency components thereof to provide a smoothly-changing pseudo-band-pass-filtered-envelope carrier waveform 18a' (FIG. 4, waveform e) to the linear inverter. The modulating waveform (FIG. 4, waveform b), illustratively during the bit time interval between times $t_0$ and $t_1$ was a high logic level, and transitions at time $t_1$ to a low logic value, indicative of transmitting a binary 1 data bit with 180° differential phase-shift modulation. Responsive to the change in logic level at modulation level 36b, linear inverter 36 does not invert the synthesized waveform during the next bit time interval, such that this next-bit-time-interval synthesized waveform 18b' is 180° phase-shifted with respect to the phase of first bit time interval synthesized waveform 18'. It should be understood that if a logic 0 data bit is to be transmitted, the modulation waveform does not transition at the end of a previous bit time interval, i.e. at time $t_1$, but remains at its previous logic level, e.g. a high level, as shown by line segment 50 of FIG. 4, waveform b. For a logic zero transmission, inverter 36 does not detect a modulation transition at the time of the negative transition of the control waveform 36d and therefore does invert the waveform applied to its output 36c, at time $t_1$, to provide a non-phase shifted output waveform 18b' (shown in broken line in FIG. 4, waveform e). Linear transmitter 38 amplifies the waveform to a power level sufficient for communication over media 11.

It will be seen that the frequency of the carrier waveform "stored" in ROM 32 does not have to be integrally related to the clock frequency. If N=the number of data words in the ROM, then for the embodiment of FIG. 3, $f_c=(2\ N/T)$ i.e. 61440 Hz. for N=1024 and T=1/30 second. The clock frequency should be synchronized to a system-wide frequency if the carrier frequency is to track that system-wide frequency. The transmitted carrier frequency can, therefore, be changed over a relatively large range by merely changing the ROM, thereby changing the stored data pattern and the number of carrier frequency cycles produced during a bit time interval. Thus, all transmitter units in a multi-transmitter, multi-frequency multiplex system can be identical except for the frequency-determining ROM. If a programmable read-only memory (PROM) is utilized, changes in carrier frequency and carrier envelope waveshape can be modified in relatively rapid and cost-effective manner.

Figure 5:
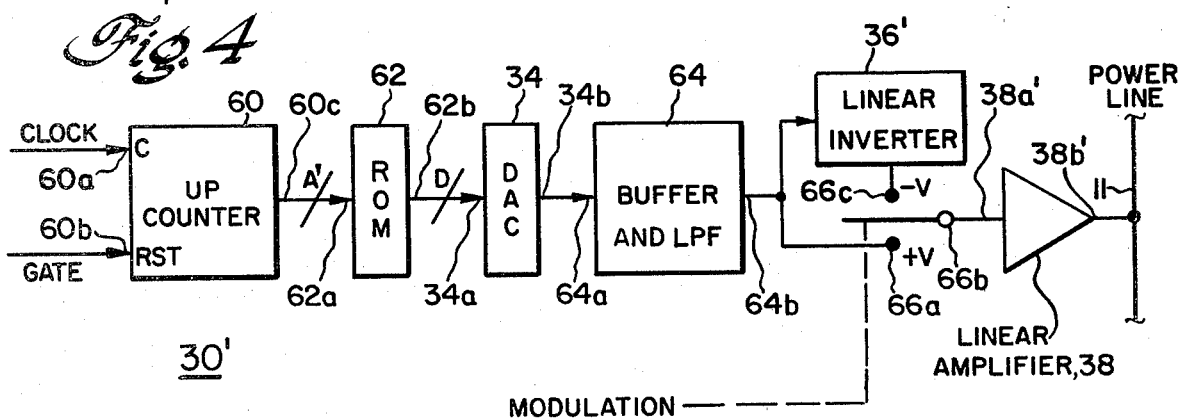
FIG. 5 is a block diagram of another preferred system for synthesizing a data communication system modulated carrier in accordance with the principles of the present invention.

Referring now to FIG. 5, in another preferred embodiment, apparatus 30', for synthesizing a modulated carrier, utilizes a unidirectional-counting counter means 60, having a clock C input 60a receiving the clock frequency pulses and having a reset (RST) input 60b receiving a gate pulse. Counter means 60 provides a number A' of output lines 60c, equal in number to the number of address bits required at the address input port 62a of a ROM 62. A number D of parallel data output lines 62b of the ROM are connected to the D input lines 34a of the DAC 34, to establish the voltage level at the output 34b thereof. Each of the multiplicity of ROM storage locations stores the digital value of an associated one of a multiplicity of points of the carrier frequency waveform throughout one full bit period thereof. Because counter 60 counts in a single direction, there is no reversal in the sequence of addresses applied to ROM 62 and the digital values for the synthesized carrier waveform for the entire bit time interval must be stored within the ROM; hence, the number $2^{A'}$ of addressable storage locations e.g. 2048 addressable locations, required in ROM 62 is twice as large as the number $2^A$ of storage locations e.g. 1024 locations, required in ROM 32 of FIG. 3. Therefore, $2^{A'}=2\times 2^A$ and $A'=A+1$, or $2^{A'}=2^{A+1}$ and whereby counting means 60 requires $A'=A+1$ stages, or one more binary counting stage than counter 34 of FIG. 3.

In operation, the carrier wave frequency $f_o$ is, as previously stated hereinabove for the illustrative powerline communications system, to be an odd multiple of the first sub-harmonic of the system-wide (powerline) frequency $f_L$, while the clock frequency $f_c$ is a multiple (typically $2^{A'}$) of the baud rate, itself set equal to the system-wide frequency first sub-harmonic, for reasons set forth hereinabove. Illustratively, a powerline communications system has a nominal system-wide frequency of 60 Hz. and thus has a system-wide frequency first sub-harmonic of nominal 30 Hz. frequency. The integer utilized for exponent $A'$ is established by the number of addressable locations in ROM 62. Illustratively, ROM 62 has $R=2048$ ($=2^{11}$) addressable locations at each of which an 8-bit data word is storable. Thus, $A'=11$ and $T=2/f_L$, the required clock frequency $f_c=R/T=(f_L/2)(2^{A'})$ (e.g. 61440 Hz.) nominal. The exact frequency will be advantageously phase-locked to the frequency on powerline 11 and will be 1024 times greater than the powerline frequency. Illustratively, the carrier frequency $f_o(=f_L/2)(2\ N+1))$ is equal to 5010 Hz. with $N=83$ for a particular carrier in a multiple-carrier frequency-multiplexed system. Other selectable carrier frequencies are spaced above and below the illustrated carrier frequency by integer multiples of the instanteous powerline frequency. Since the carrier frequency is to be synthesized in apparatus 30', which apparatus is powered by a clock signal advantageously phase-locked to the instanteous powerline frequency, the synthesized carrier waveform frequency also tracks the instanteous frequency of the powerline and remains at an exact odd multiple of the first sub-harmonic thereof. Thus, in the illustration, in each bit time interval T, of e.g. one-thirtieth of a second, an odd number, e.g. 167, of cycles of the carrier frequency waveform must be synthesized in response to ($2^{A'}$), e.g. 2048, clock pulses 45 (waveform a, FIG. 4).

In operation, clock frequency pulses may be continuously applied to counter clock input 60a; the counter is held with a zero output count if the gate signal at input 60b is at a first logic level, and is permitted to sequentially count up, from a zero count, only when the remaining binary logic level appears at gate input 60b. When transmission of a modulated carrier is to occur, the gate signal is raised to the remaining binary logic value and the count at counter output 60c sequentially and cyclically counts from zero to the maximum count of the counter (which is set equal to the number of locations in ROM 62). When the maximum count is reached, the next counted input clock brings the counter to a count of zero and the counter continues to cycle through the entire counting range, as long as the gate input is enabled. The cyclic application of sequential addresses to ROM 62 provides the cyclic application of the sequential data values, for the one bit period of the desired envelope-shaped carrier frequency waveform, to DAC 34. Responsive thereto, the voltage at DAC output 34b is a selected step-wise synthesized approximation of the envelope-shaped carrier frequency waveform. This voltage is applied to the input 64a of a buffer and lowpass filter means 64. The voltage at the output 64b thereof is the smooth envelope-shaped carrier frequency waveform having a contsant phase. Illustratively, for transmitting phase-shift-keyed modulation, wherein a first binary logic level, e.g. a binary 1, is represented by 180° phase of the carrier waveform, and the remaining binary logic value, e.g. a binary 0, is represented by the 0° phase of the carrier waveform, the modulating apparatus of FIG. 5 can be utilized. With non-differential phase-shift modulation, a string of binary ones will produce a steady carrier at 180° phase, relative to a reference phase, while a string of binary zeros will produce a steady carrier at 0° phase (e.g. a 4-bit data word "1010" results in 180° phase-shifts occurring at the baud rate, e.g. 30 Hz.). Thus, the carrier can be continually sent with 0° phase, as by connecting the buffer-lowpass filter means output 64b from one selectable contact 66a to the common contact 66b of a switch means 66 to the input 38a' of linear amplifier 38', having its output 38b' connected to the transmission media, e.g. powerline 11. When a binary 1 is to be sent, with a 180° phase-shift, the common contact 66b of switch means 66 may be connected to the remaining selectable contact 66c, and the inverted, or 180°-phase carrier waveshape at the output of linear inverter 36' is connected to linear amplifier 38'. The waveform-synthesis values stored in a unidirectionally-counter-addressed ROM are such that a full number of carrier waveform cycles are generated in each bit time interval.

Figure 5A:
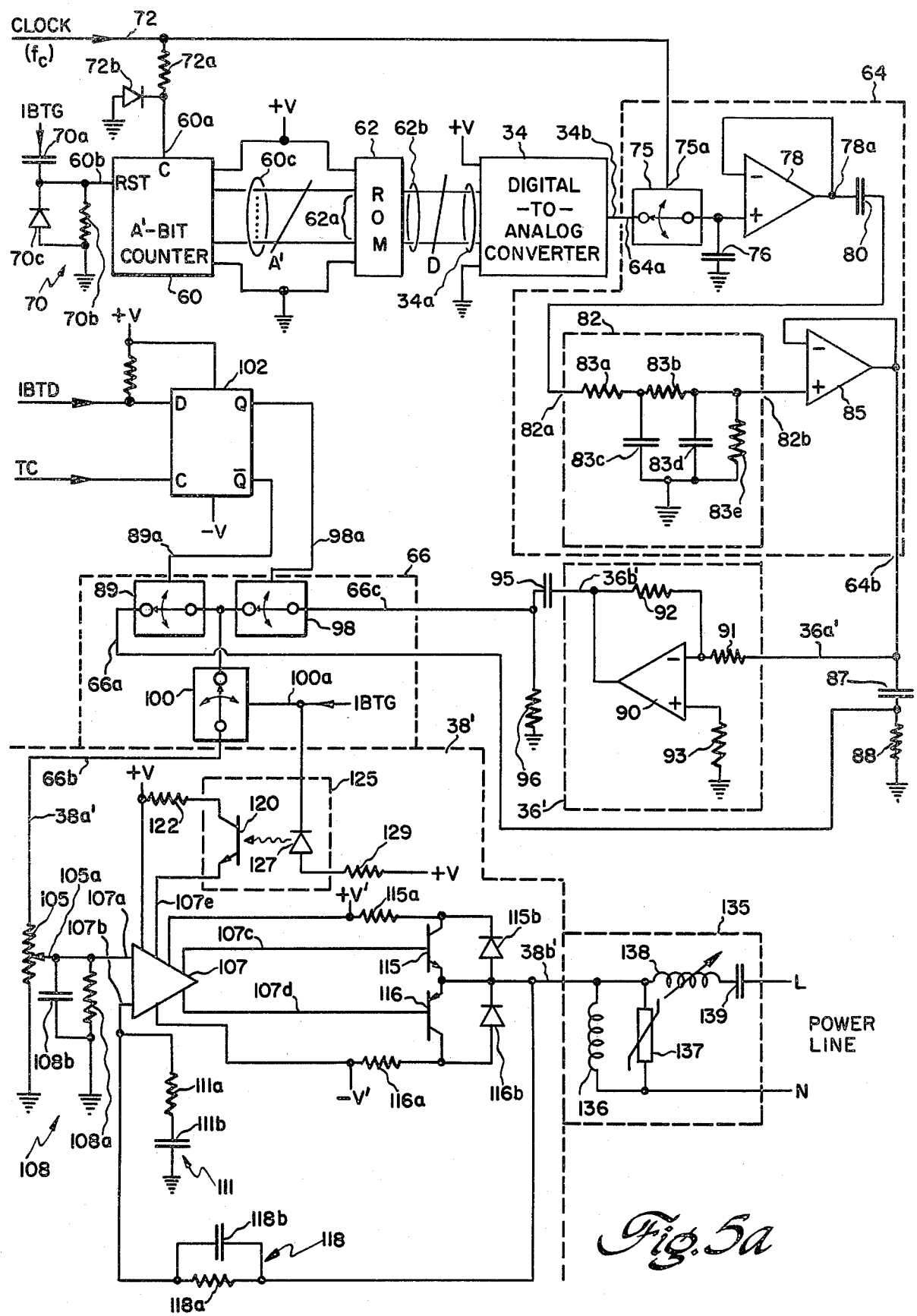
FIG. 5a is a schematic block diagram of apparatus implementing the system of FIG. 5.

Referring now to FIG. 5a, a presently preferred implementation of the unidirectional-counting, phase-shift-keyed transmitter embodiment of FIG. 5 is shown. The transmitter is operative only if an inbound transmit gate (IBTG) assumes a positive logic state, commencing at the start of a transmission sequence and terminating at the cessation thereof. The IBTG waveform leading edge is differentiated in a differentiator 70 having a differentiation capacitor 70a connected in series with a differentiator load resistance 70b; a negative-clipping diode 70c is connected in parallel with resistor 70b to shunt negative-going differentiated transitions of the IBTG signal to ground potential. The resulting positive pulse, at the commencement of the IBTG signal, is applied to the reset (RST) input 60b of the A'-bit counter 60. Thus, at the instant that the IBTG signal goes to the positive logic level, at the start of a transmit sequence, the RST input of counter 60 receives a positive, resetting signal, whereby all of the counter stages are reset to a count of zero and all of the A counter output line 60c have zero logic levels thereon. Illustratively, counter 60 is a CMOS 4040 integrated circuit, with $A'=11$, and therefore capable of sequentially addressing $2^{A'}=2^{11}=2048$ data storage locations in ROM 62. The counter also receives a train of pulses, at the clock frequency $f_c$, at its count C input 60a, from clock frequency waveform input line 72, via a series resistance 72a and with a diode 72b connected at the clock input with polarity such that the negative portions of the clock waveform are shunted to ground potential, to provide counter 60 with the required clock waveform, alternating between substantially ground potential and a positive potential.

The counter output lines are connected to the addressing input lines 62a of ROM 62, which is illustratively a type 2316 integrated circuit, storing an 8-bit data byte at each of the 2048 addressable locations therein. The multiplicity D of ROM data output lines 62b are coupled to a like number of DAC data input lines 34a. Illustratively, as each addressable space in the 2316 integrated circuit ROM stores an 8-bit data byte, D=8 in the illustrative example. The DAC, which may be a type ZN425J available from Ferranti Electric, provides a unipolar analog voltage at its analog voltage output 34b, having an amplitude established by the 8-bits of data received from ROM 62 for each of the sequential $2^{A'}$, e.g 2048, sequential counting-addressing states of counter 60. The clock frequency $f_c$ is set, as previously stated hereinabove, to be an accurately-tracking multiple of the system-wide (powerline) frequency, whereby the entire sequence of ROM addressable data storage locations are sequentially addressed in one bit time interval T. Therefore, the analog waveform at DAC output 34b is the carrier frequency waveform, having a total of R carrier cycles in each bit time interval. Illustratively, since a bit time interval T is equal to the time required for one-cycle of the system-wide frequency first sub-harmonic ($T=f_L/2$), or one-thirtieth of a second in the illustrative embodiment, and the carrier frequency $f_o$ is an odd multiple of the same system-wide frequency first sub-harmonic ($f_o=(2\ N+1)f_L/1$) there are $R=(2\ N+1)$ cycles of carrier to be generated in each bit time interval. Illustratively, where N=83, a carrier frequency of 5010 Hz. results, with R=167 cycles of carrier frequency being generated in every bit time interval T(=1/30 second). In this same bit time interval, the clock frequency must contain $2^{A'}=2048$ cycles, for a clock frequency $f_c$ of 61440 Hz. nominal, which is actually $2^{A'-1}$ times the powerline frequency.

Resetting the counter to a zero count when IBTG goes to the positive logic level at the start of a transmit sequence phases the counter output count and, therefore, the transmitted waveform, such that data modulation changes occur at times when the transmit waveform envelope is going through zero. The sequentially-addressed memory locations provide the data for DAC output 34b to be a step-wise representation of the desired band-pass-filtered, carrier waveform analog voltage.

The data value D' of each analog step, and therefore the 8-bit binary data pattern stored at each location of the ROM, may be, in one preferred embodiment selected in accordance with the formula:

$$D' = D_a \cos(\pi R(I-(L/2)-0.5)/(L/2)$$

where R is the number of cycles of carrier wave (e.g. 167) required in each bit time interval T and L is the number of addressable memory locations (e.g. 2048) in ROM 62. The value of function $D_a$ is given by the equation $$D_a = (2(1-2c)/Y) + \sum_{n=1}^{N} (2/\pi n)(D_b)(D_c)(D_d)(D_e)$$

where
$D_b = Y^2/(Y^2 - 16c^2n^2)$;
$D_c = \sin(2\pi n(1-2c)/Y)$;
$D_d = \cos(2\pi cnY)$; and
$D_d = \cos(\pi n(I-(L/2)-0.5)/Y(L/2))$ where: I is the address location, i.e. an integer between 1 and L; c is an arbitrarily chosen constant affecting the rolloff of the amplitude envelope at each end of the baud; Y is an arbitrarily chosen constant affecting the line structure of the resulting spectrum; and n is an arbitrarily chosen constant truncating the spectrum at the n-th harmonic. In the particular systems application, the values of c=(24.5/240), Y=10 and n=67, have been effectively utilized to reduce adjacent data channel interference. Values obtained from the above data value equations are scaled to fit within the range of integers storable in ROM 62, e.g. a data value range of zero to 255 for an 8-bit data byte utilized with a unipolar DAC. The scaled data values are rounded off to the nearest integer and stored at the memory location of the ROM having the associated address.

As is well known, if, during a change of binary-coded data bits to the DAC input 34, several bits on the multiplicity of input lines do not change at exactly the same time, the voltage at DAC output 34b may instantaneously go to an erroneous value; the resulting analog voltage spike is often called a "glitch". To prevent glitches from appearing at the input of lowpass-filter-buffer means 64, an analog switch 75 is operative to connect the DAC output voltage to a holding capacitor 76 only after the DAC output voltage has stabilized, after each step-wise increment or decrement thereof. Switch-means 75 is a single pole-single throw switch (which may be of mechanical, electromechanical or electronic implementation) which is operated at the clock frequency $f_c$ by connection of the enabling input 75a to clock line 72. When the clock waveform, a symmetrical squarewave, goes negative, providing a falling transition to counter means counting inputs 60a and increasing the count therein, switch means input 75a utilizes the negative clock potential to open switch means 75, disconnecting DAC output 34b from holding capacitor 76. A high-input-impedance operational amplifier voltage-follower 78 is connected to holding capacitor 76, so that a voltage at the output 78a thereof is the voltage, previously provided by DAC output 34b, held on capacitor 76 during the negative portion of the clock waveform. When the clock waveform enters the subsequent positive portion of its cycle, counter 60 has already advanced its count, addressing a new memory space in ROM 62 and providing DAC 34 with a new input data byte. The DAC output 34b voltage has stabilized and, as all possible glitches have terminated, the positive clock waveform voltage at switching means input 75a closes switching means 75 to charge holding capacitor 76 to the new analog voltage; buffer amplifier output 78a follows the voltage across holding capacitor 76 to the new value, in glitch-free manner.

The analog voltage at buffer amplifier output 78a is coupled by a capacitor 80 to the input 82a of a resistance-capacitance lowpass filter 82, including series resistors 83a and 83b, shunt capacitances 83c and 83d and a terminating shunt resistance 83e. Lowpass filter 82 removes higher frequency components of the step-wise band-pass-filtered carrier waveform, whereby a band-pass-filtered sinusoidal waveform appears across shunt load resistor 83e, at lowpass filter output 82b. The now-sinusoidal carrier waveform is coupled to the non-inverting input of an operational amplifier voltage-follower means 85 having its output providing the lowpass filter-buffer means output 64b voltage. This voltage is coupled through a coupling capacitor 87 to a first load resistor 88 and to a selectable contact of another single-pole, single-throw switch means 89. The signal voltage at LPF-filter means output 64b is also coupled to the input 36a' of a unity-gain analog voltage inverter 36'. The inverter includes an operational amplifier 90, having its inverting input coupled through an input resistance 91 to the inverting amplifier input 36a', and having the operational amplifier output connected to both the inverter output 36b' and to the inverting input via a feedback resistance 92. A compensation resistor 93 may be connected between ground potential and the non-inverting input of amplifier 90. The voltage at inverter means output 36b' is substantially instantaneously of the same amplitude, but of opposite polarity, as the analog voltage at LPF-buffer means output 64b. The inverted analog voltage is coupled through coupling capacitor 95 to appear across a load resistor 96 and also at the selectable-contact of another single-pole, single-throw switch means 98. The common contacts of both switch means 89 and 98 are connected together to one contact of a fourth single-pole, single-throw switch means 100, having its remaining contact forming the common terminal 66b of switch means 66. The switch means 89 and switch means 98 activating voltages, for selecting that one of the signals at switch means inputs 66a and 66c for coupling to output 66b, must be present in mutually-exclusive fashion. This is achieved by connecting the respective switch means inputs 98a and 89a respectively to the true Q output and inverted $\bar{Q}$ output of a D-type flip-flop logic element 102, having its data D input connected through a pullup resistor 103 to positive operating potential V and receiving the inbound transmit data (IBTD) waveform. A clock C input of element 102 receives a transmit clock (TC) waveform. The TC waveform is established (by circuitry not shown) to go to a positive logic level at the beginning of each bit time interval T. The IBTG signal goes to its positive logic level, indicative of the start of a data transmission, simultaneously with one of the positive transitions of TC. Only with the change of the TC waveform to its positive logic level will the incoming data of the IBTD waveform be passed through flip-flop logic element 102 to set the state of the Q output thereof to the same logic value as that of the IBTD waveform and the logic state of the $\bar{Q}$ waveform to the inverse of the IBTD waveform, for operation of switch means 89 and 98. As the TC waveform is established with exactly $2^A$' (e.g. 2048) cycles of the clock frequency $f_c$ (e.g. 61440 Hz.) for each positive transition of the transmit clock TC waveform, all of the addresses of ROM 62 are sequentially cycled through for each cycle of the TC waveform, starting with the lowest (zero) ROM address at the instant TC goes positive. The logic state of the IBTD waveform selects that one of the 0°-phase and 180°-phase waveforms at switch means inputs 66a and 66c, respectively, for coupling to switch means 100. Since IBTG is positive when the IBTD and TC waveforms appear at the flip-flop logic element 102 inputs, switch means 100 is closed to provide a carrier frequency waveform of phase selected by the logic value of the data, at switch means output 66b. Switch means 66b provide an open circuit at linear transmitter input 38a', when IBTG is at a low logic level (indicative of non-transmission of data) and is closed to couple the required phase of the synthesized psuedo-band-pass-filtered carrier waveform to the linear transmitter input when IBTG is at a positive logic level (indicative of data transmission currents). It should be understood that switch means 89 and 98 may be combined into a single-pole double-throw switch means and that switch means 100 may be unnecessary if three-state electronic switch means are utilized for the individual switch means 89 and 98, or for the switch means acting as a combination thereof.

Linear transmitter 38' has the input 38a' thereof connected across gain control potentiometer 105 having its adjustable contact 105a connected to one input 107a of a differential amplifier 107, such as a type 540 amplifier available from Signetics. A compensating network 108 consisting of a shunt resistance 108a and a shunt capacitance 108b, is connected between input 107a and ground potential. A series compensation network 111, consisting of a series resistance 111a and a series capacitance 111b is connected between ground potential and the remaining differential input 107b of the amplifier. The differential outputs 107c and 107d are respectively connected to the base electrodes of a pair of complimentary output transistors 115 and 116, respectively, having their emitter electrodes connected together to linear transmitter output 38b'. The output transistor collector electrodes are connected through protection resistors 115a and 116a, respectively, to positive and negative linear amplifier operating potentials of magnitude V'. The collector-emitter circuits of transistors 115 and 116 are each respectively shunted by a normally-reverse-biased protection diode 115b and 116b, respectively. The linear transmitter output 38b' is connected to second differential input 107b via a compensated feedback network 118, including a feedback resistance 118a in parallel with a feedback capacitor 118b. Amplifier 107 includes a control input 107e which is connected in series with the collector-emitter circuit of a photo-transistor 120 and a current-limiting resistor 122 to operating potential of magnitude +V. Photo-transistor 120 is a part of an optoelectronics isolator means 125 also having a light-emitting diode 127 having its cathode connected to the source of the IBTG voltage and having its anode connected through a current limiting resistor 129 to positive operating potential. When IBTG is at a low logic level (when transmission is not desired) a relatively large amount of current flows through diode 127 and a relatively large current is enabled to flow through transistor 120, into amplifier control input 107e biasing amplifier 107 to an off condition and disabling linear transmitter output 36b'. When transmission is desired, the IBTG signal is at a relatively higher logic level, reducing the current flowing in light-emitting diode 127, with resulting reduction of photo-transsistor 120 current flow and subsequent enablement of amplifier 107. With the amplifier enabled, the carrier frequency waveform, with phase selected in accordance with the logic state of the IBTD data waveform, appears as an amplified pseudo-band-pass filtered carrier waveform at linear amplifier output 36b.

A coupling network 135 includes a shunt inductance 136 and a shunt varistor 137 coupled between transmitter output 36b' and the powerline neutral N, and a series resonant circuit of inductance 138 and capacitance 139 coupled between the amplifier output and the line hot conductor L. The coupling network is utilized to couple the carrier waveform at linear amplifier output 36b to the transmission media (the powerline) for transmission to one or more receiving locations.

With the illustrated implementation of FIG. 5a, a transmitter set for a carrier frequency $f_c$ of 6990 Hz. has sideband components at adjacent channel frequencies, such as 6630 Hz. and 7350 Hz., but these undesired sideband components are at least 60 db down from the desired channel peak amplitude. This is achieved for a psuedo-band-pass-filtered response, although other undesired adjacent channel component suppressions may be achieved using different psuedo-band-pass-filtering constants or other carrier waveform envelope shapes. Thus, it will be seen that a high degree of adjacent channel interference suppression may be achieved with apparatus in which additional carrier-frequency-generating components are not required and which does not utilize a band-pass-filter.

While the present invention has been described with respect to several preferred embodiments thereof, many variations and modifications will now become apparent to those skilled in the art. It is my intent, therefore, to be limited only by the scope of the appending claims, and not by the specific details presented herein.

What is claimed is:

1. Apparatus for use in a digital communication system for synthesizing a digital-data-modulated carrier waveform for transmission via a selected medium, said digital data being a sequence of binary data bits each having one of first and second binary data values, and said carrier waveform is phase-shift-keyed by said binary data, comprising:

read-only memory means for storing at each of a multiplicity of individually addressable memory locations a data word defining each of a sequential plurality of carrier amplitudes;
   counter means having an input enabled at a clock frequency for providing an output signal sequentially and cyclically counting the input clock frequency, said count output signal coupled to said memory means to sequentially and cyclically read the carrier-amplitude-defining data words stored therein from the memory locations of said memory means;
   means receiving the sequential data words cyclically read out of said read-only memory means for converting each data word to an associated amplitude of an analog voltage, said analog voltage being a step-wise representation of said carrier waveform having a desired carrier frequency and a desired envelope shape;
   means for low-pass filtering said analog voltage to provide a substantially sinusoidal representation of said carrier waveform;
   means for modulating the substantially sinusoidal carrier waveform in accordance with each bit of digital data to be transmitted, and including means receiving the carrier waveform from said low-pass-filtering means for inverting the phase thereof;
   means receiving said binary data for selecting the output of said low-pass-filtering means for transmission of said modulated carrier waveform having said first binary data value and for selecting the output of said phase inverting means for transmission of said modulated carrier waveform having said second binary data; and
   means for coupling the data modulated carrier waveform to said selected medium.

2. The apparatus of claim 1, wherein said selecting means is a switch having a common terminal and first and second selectable terminals respectively receiving the signals from said low-pass filtering means and said phase inverting means, the connection between said common terminal and one of said first and second selectable terminals respectively being completed responsive to transmission of a data bit having said first and second binary data values respectively.

3. The apparatus of claim 1, wherein said clock frequency is an integer multiple of said carrier waveform frequency.

4. The apparatus of claim 1, wherein said counter means is a counter sequentially and cyclically counting in a single direction and having as many counting states as the number of said multiplicity of memory locations, each counting state addressing and reading stored data from an associated one of the memory locations in said read-only memory means.

5. Apparatus for use in a digital communication system for synthesizing a digital-data-modulated character waveform for transmission via a selected medium, comprising:

read-only memory means for storing at each of a multiplicity of individually addressable memory locations a data word defining each of a sequential plurality of carry amplitudes, the data words stored in said multiplicity of memory locations in said read-only memory means defining each of a sequential plurality of band-pass-filtered carrier amplitudes for the carrier waveform in a first half of a time interval during which a single bit of data is to be transmitted;
   bi-directional up/down counter means having an input enabled at a clock frequency, an output at which is provided an output signal sequentially and cyclically counting the input clock frequency, and a control input enabling the count at said output to respectively increase and decrease responsive to first and second control signals present thereat;
   means receiving the sequential data words cyclically read out of said read-only memory means for converting each data word to an associated amplitude of an analog voltage, said analog voltage being a step-wise representation of said carrier waveform having a desired carrier frequency and a desired envelope shape;
   control means receiving said clock frequency for providing said first control signal to said counter control input to enable said output count ot sequentially address the plurality of memory locations defining said carrier amplitudes during said first half of said bit time interval and providing said second control signal to said counter control input for reversing the count of said counter to cause said memory means addresses to sequentially return through all memory location addresses during the second half of said bit time interval, to provide therein carrier amplitudes which are the mirror image of the carrier amplitudes provided during said first half of said bit time interval;
   means for low-pass filtering said analog voltage to provide a substantially sinusoidal representation of said carrier waveform; and
   means for modulating the substantially sinusoidial carrier waveform in accordance for coupling data modulated carrier waveform to said selected medium.

6. The apparatus of claim 5, wherein said digital data is a sequence of binary data bits each having one of first and second binary data values, and said carrier waveform is differential-phase-shift modulated by said binary data bit sequence; said modulating means including means for reversing the phase of said carrier waveform only when a bit having said first binary data value is to be transmitted and for maintaining the phase of said carrier waveform when a bit having said second binary data value is to be transmitted.

7. The apparatus of claim 6, wherein said phase reversing means is a linear phase inverter having a first input receiving the carrier waveform from said low-pass-filtering means, a second input receiving the binary data value of each bit of data to be transmitted, and an output at which a carrier waveform appears with a phase inversion occurring for each transition in the data bit sequence at said second input, the phase of said carrier waveform at said linear inverter output remaining substantially constant when a transition does not occur for a data bit then being transmitted.

8. The apparatus of claim 5, wherein said digital data is a sequence of binary data bits, each having one of first and second binary data values, and such carrier waveform as phase-shift-keyed by said binary data; said modulating means including means receiving the carrier waveform from said low-pass-filtering means for inverting the phase thereof; and means receiving said binary data for selecting output of said low-pass-filtering means for transmission of said modulated carrier waveform having said first binary data value and for selecting the output of said phase inverting means for transmission of said modulated carrier waveform having said second binary data value.

9. The apparatus of claim 8, wherein said selecting means is a switch having a common terminal at first and second selectable terminals respectively receiving the signals form said low-pass-filtering means and said phase inverting means, the connection between said common terminal and one of said first and second selectable terminals respectively being completed response to transmission of a data bit having said first and second binary data values respectively.

10. The apparatus of claim 5, wherein said clock frequency is an integer multiple carrier waveform frequency.

11. A method of synthesizing a digital data modulated carrier waveform for transmission in a digital communication system, wherein said digital data is a sequence of binary data bits each having one of first and second binary data values, comprising the steps of:
(a) storing a multiplicity of data words each defining a sequential one of a multiplicity of amplitudes of a carrier waveform having a selected envelope shape;
(b) sequentially and cyclically reading each of the data words;
(c) converting each of the sequentially cyclically read data words directly to an associated amplitude of an analog voltage to provide a step-wise representation of said carrier waveform at a desired carrier frequency and having a desired envelope shape;
(d) filtering the step-wise carrier waveform representation analog voltage to reduce the harmonic content thereof at frequencies above the desired carrier frequency; and
(e) simultaneously providing said carrier waveform analog voltage at a reference phase and at another phase substantially shifted 180° therefrom; and
(f) selecting one of the reference phase and substantially 180° shifted phase for transmission responsive to a data bit respectively having one of the respective first and second binary data values.

12. The method of claim 11, further comprising the step of (f) linearly amplifying the modulated carrier waveform analog voltage prior to transmission.

13. The method of claim 12, wherein the linearly amplifying step is carried out only when digital is to be transmitted.

14. The method of claim 11, wherein step (b) includes the step of sequentially and cyclically reading the stored data words in a single direction.

15. A method for synthesizing a modulated data carrier waveform for transmission in a digital communication system, comprising the steps of:
(a) storing a multiplicity of data words each defining a sequential one of a multiplicity of carrier amplitudes of a carrier waveform having a selected envelope shape for only a first half of a time interval in which a data bit is to be transmitted;
(b) sequentially reading all the stored data words in a first direction during the first half of the data bit time interval;
(c) then reading the stored data words in reverse order during a remaining half of the data bit time interval to provide a mirror image of carrier waveform amplitudes generated during the first half of the data bit time interval;
(d) converting each of the sequentially cyclically read data words to an associated amplitude of an analog voltage to provide a step-wise representation of said carrier waveform at a desired carrier frequency and having a desired envelope shape;
(e) filtering the step-wise carrier waveform representation analog voltage to reduce the harmonic content thereof at frequencies above the desired carrier frequency; and
(f) varying the phase of the filtered carrier waveform analog voltage in accordance with the data value of each bit of the digital data to be transmitted.

16. The method of claim 15, wherein step (e) includes the step of differentially phase-shift modulating the carrier waveform analog voltage in accordance with the data value of each bit of the digital data to be transmitted.

17. The method of claim 16, wherein said digital data is a sequence of binary data bits each having one of first and second binary data values, and said differentially phase-shift modulating step includes the steps of: reversing the phase of said carrier waveform analog voltage only when said first binary data value is to be transmitted for a bit of digital data; and maintaining the phase of said carrier waveform analog voltage when a bit of digital data having the second binary data value is to be transmitted.

18. The method of claim 17, wherein the step of reversing the phase of said carrier waveform occurs for each transition from one of said first and second binary data values to the remaining one of said first and second binary data values of any bit of the digital data to be transmitted.

19. The method of claim 15, wherein step (e) includes the step of phase-shift keying the carrier waveform analog voltage in accordance with the data value of each bit of the digital data to be transmitted.

20. The method of claim 19, wherein said digital data is a sequence of binary data bits each having one of first and second binary data values, and said phase-shift keying step includes the steps of simultaneously providing said carrier waveform analog voltage at a reference phase and another phase substantially shifted when 180° therefrom and; and selecting one of the reference phase and substantially 180° shifted phase for transmission responsive to a data bit respectively having one of the respective first and second binary data values.

* * * * *